United States Patent
Hall et al.

(10) Patent No.: US 12,196,889 B2
(45) Date of Patent: *Jan. 14, 2025

(54) LIDAR SIGNAL ACQUISITION

(71) Applicant: VELODYNE LIDAR USA, INC., San Jose, CA (US)

(72) Inventors: David S. Hall, Oakland, CA (US); Rajanatha Shettigara, San Jose, CA (US); Nathan Slattengren, San Francisco, CA (US); Aaron Chen, Fremont, CA (US); Anand Gopalan, Foster City, CA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 17/902,750

(22) Filed: Sep. 2, 2022

(65) Prior Publication Data

US 2023/0168348 A1    Jun. 1, 2023

Related U.S. Application Data

(63) Continuation of application No. 16/987,060, filed on Aug. 6, 2020, now Pat. No. 11,435,446, which is a
(Continued)

(51) Int. Cl.
*G01C 3/08* (2006.01)
*G01S 7/481* (2006.01)
(Continued)

(52) U.S. Cl.
CPC ............ *G01S 7/4815* (2013.01); *G01S 7/481* (2013.01); *G01S 7/484* (2013.01); *G01S 7/486* (2013.01);
(Continued)

(58) Field of Classification Search
CPC ........ G01S 7/4815; G01S 7/481; G01S 7/484; G01S 7/486; G01S 7/4863; G01S 7/4865;
(Continued)

(56) References Cited

U.S. PATENT DOCUMENTS 7,969,558 B2 * 6/2011 Hall ..................... H01S 5/0428
356/141.5
9,529,079 B1   12/2016 Droz et al.
(Continued)

FOREIGN PATENT DOCUMENTS

JP       62184381 A    8/1987
JP     2012242218 A   12/2012

OTHER PUBLICATIONS

CN201880074150.3, "Office Action", Feb. 3, 2023, 14 pages.
(Continued)

*Primary Examiner* — Mark Hellner
(74) *Attorney, Agent, or Firm* — Kilpatrick Townsend & Stockton LLP

(57) ABSTRACT

Methods and systems for combining return signals from multiple channels of a LIDAR measurement system are described herein. In one aspect, the outputs of multiple receive channels are electrically coupled before input to a single channel of an analog to digital converter. In another aspect, a DC offset voltage is provided at the output of each transimpedance amplifier of each receive channel to improve measured signal quality. In another aspect, a bias voltage supplied to each photodetector of each receive channel is adjusted based on measured temperature to save power and improve measurement consistency. In another aspect, a bias voltage supplied to each illumination source of each transmit channel is adjusted based on measured temperature. In another aspect, a multiplexer is employed to
(Continued)

multiplex multiple sets of output signals of corresponding sets of receive channels before analog to digital conversion.

20 Claims, 11 Drawing Sheets

Related U.S. Application Data continuation of application No. 16/134,000, filed on Sep. 18, 2018, now Pat. No. 10,739,444.

(60) Provisional application No. 62/559,783, filed on Sep. 18, 2017.

(51) Int. Cl.
| | |
|---|---|
| *G01S 7/484* | (2006.01) |
| *G01S 7/486* | (2020.01) |
| *G01S 7/4863* | (2020.01) |
| *G01S 7/4865* | (2020.01) |
| *G01S 7/497* | (2006.01) |
| *G01S 17/06* | (2006.01) |
| *G01S 17/08* | (2006.01) |
| *G01S 17/42* | (2006.01) |
| *G01S 17/89* | (2020.01) |

(52) U.S. Cl.
CPC .......... *G01S 7/4863* (2013.01); *G01S 7/4865* (2013.01); *G01S 7/497* (2013.01); *G01S 17/06* (2013.01); *G01S 17/08* (2013.01); *G01S 17/42* (2013.01); *G01S 17/89* (2013.01)

(58) Field of Classification Search
CPC .......... G01S 7/497; G01S 17/06; G01S 17/08; G01S 17/42; G01S 17/89
See application file for complete search history.

(56) References Cited

U.S. PATENT DOCUMENTS

| | | | |
|---|---|---|---|
| 10,739,444 B2 * | 8/2020 | Hall | .................. G01S 7/4863 |
| 11,435,446 B2 * | 9/2022 | Hall | .................. G01S 7/4815 |
| 2010/0054758 A1 * | 3/2010 | Ereifej | ............... H04B 10/695 |
| | | | 398/202 |
| 2011/0147567 A1 | 6/2011 | Grazioso et al. | |
| 2014/0291491 A1 * | 10/2014 | Shpunt | ................... G01S 7/497 |
| | | | 250/214.1 |
| 2015/0202939 A1 * | 7/2015 | Stettner | ................ B60R 21/013 |
| | | | 701/45 |
| 2017/0219695 A1 | 8/2017 | Hall et al. | |
| 2017/0242102 A1 * | 8/2017 | Dussan | ................ G01S 7/4813 |
| 2018/0188452 A1 * | 7/2018 | Sun | ......................... G01S 17/42 |

OTHER PUBLICATIONS

EP18857239.0, "Office Action", Aug. 4, 2023, 6 pages.
CN201880074150.3, "Office Action", Jan. 30, 2024, 12 pages.
CN201880074150.3, "Notice of Decision to Grant", May 7, 2024, 5 pages.
KR10-2020-7011208, "Office Action", Apr. 18, 2024, 28 pages.
KR10-2020-7011208, "Office Action", Jul. 17, 2024, 9 pages.

* cited by examiner

LIDAR SIGNAL ACQUISITION

CROSS REFERENCE TO RELATED APPLICATION

The present application is a continuation of and claims priority to U.S. application Ser. No. 16/987,060, filed on Aug. 6, 2020 and entitled "Lidar Signal Acquisition," which is a continuation of and claims priority to U.S. application Ser. No. 16/134,000, filed on Sep. 18, 2018 and entitled "Lidar Signal Acquisition", which, claims priority under 35 U.S.C. § 119 from U.S. provisional patent application Ser. No. 62/559,783 entitled "LIDAR Signal Acquisition," filed Sep. 18, 2017, the subject matter of each of which is incorporated herein by reference in its entirety.

TECHNICAL FIELD

The described embodiments relate to LIDAR based 3-D point cloud measuring systems.

BACKGROUND INFORMATION

LIDAR systems employ pulses of light to measure distance to an object based on the time of flight (TOF) of each pulse of light. A pulse of light emitted from a light source of a LIDAR system interacts with a distal object. A portion of the light reflects from the object and returns to a detector of the LIDAR system. Based on the time elapsed between emission of the pulse of light and detection of the returned pulse of light, a distance is estimated. In some examples, pulses of light are generated by a laser emitter. The light pulses are focused through a lens or lens assembly. The time it takes for a pulse of laser light to return to a detector mounted near the emitter is measured. A distance is derived from the time measurement with high accuracy.

Some LIDAR systems employ a single laser emitter/detector combination combined with a rotating mirror to effectively scan across a plane. Distance measurements performed by such a system are effectively two dimensional (i.e., planar), and the captured distance points are rendered as a 2-D (i.e. single plane) point cloud. In some examples, rotating mirrors are rotated at very fast speeds (e.g., thousands of revolutions per minute).

In many operational scenarios, a 3-D point cloud is required. A number of schemes have been employed to interrogate the surrounding environment in three dimensions. In some examples, a 2-D instrument is actuated up and down and/or back and forth, often on a gimbal. This is commonly known within the art as "winking" or "nodding" the sensor. Thus, a single beam LIDAR unit can be employed to capture an entire 3-D array of distance points, albeit one point at a time. In a related example, a prism is employed to "divide" the laser pulse into multiple layers, each having a slightly different vertical angle. This simulates the nodding effect described above, but without actuation of the sensor itself.

In all the above examples, the light path of a single laser emitter/detector combination is somehow altered to achieve a broader field of view than a single sensor. The number of pixels such devices can generate per unit time is inherently limited due limitations on the pulse repetition rate of a single laser. Any alteration of the beam path, whether it is by mirror, prism, or actuation of the device that achieves a larger coverage area comes at a cost of decreased point cloud density.

As noted above, 3-D point cloud systems exist in several configurations. However, in many applications it is necessary to see over a broad field of view in both horizontal and vertical directions. For example, in an autonomous vehicle application, the vertical field of view should extend down as close as possible to see the ground in front of the vehicle. In addition, the vertical field of view should extend above the horizon, in the event the car enters a dip in the road. In addition, it is necessary to have a minimum of delay between the actions happening in the real world and the imaging of those actions. In some examples, it is desirable to provide a complete image update at least five times per second. To address these requirements, a 3-D LIDAR system has been developed that includes an array of multiple laser emitters and detectors. This system is described in U.S. Pat. No. 7,969,558 issued on Jun. 28, 2011, the subject matter of which is incorporated herein by reference in its entirety.

In many applications, a sequence of pulses is emitted. The direction of each pulse is sequentially varied in rapid succession. In these examples, a distance and intensity measurement associated with each individual pulse can be considered a pixel, and a collection of pulses emitted and captured in rapid succession (i.e., "point cloud") can be rendered as an image or analyzed for other reasons (e.g., detecting obstacles). In some examples, viewing software is employed to render the resulting point clouds as images that appear three dimensional to a user. Different schemes can be used to depict the LIDAR measurements as 3-D images that appear as if they were captured by a live action camera.

To measure a three dimensional environment with high resolution, throughput, and range, the measurement pulses must be very narrow and repeat at high periodicity. Current systems suffer from low resolution because they are limited in their ability to generate short duration pulses and resolve short duration return pulses at high frequency.

Saturation of the detector limits measurement capability as target reflectivity and proximity vary greatly in realistic operating environments. Power consumption may cause overheating of the LIDAR system. Light devices, targets, circuits, and temperatures vary in actual systems. The variability of all of these elements limits system performance without proper calibration of each LIDAR channel.

Improvements in the drive electronics and receiver electronics of LIDAR systems are desired to improve imaging resolution and range.

SUMMARY

Methods and systems for combining return signals from multiple channels of a LIDAR measurement system onto the input of a single channel of an analog to digital converter are described herein.

In one aspect, the outputs of multiple receive channels of a LIDAR measurement system are electrically coupled before input to a single channel of an analog to digital converter.

In a further aspect, the electrical elements in each electrical path from each photodetector of multiple receive channels of a LIDAR measurement system to an analog to digital converter are direct current (DC) coupled to one another.

In another aspect, a DC offset voltage is provided at the output of each transimpedance amplifier of each receive channel of a LIDAR measurement system to improve measured signal quality.

In another aspect, a bias voltage supplied to each photodetector of each receive channel of a LIDAR measurement system is adjusted based on a measured temperature associated with elements of the receive channels to save power and improve measurement consistency.

In another aspect, a bias voltage supplied to each illumination source of each transmit channel of a LIDAR measurement system is adjusted based on a measured temperature associated with elements of the transmit channels.

In another aspect, a multiplexer is disposed between multiple sets of receive channels and a single channel of an analog to digital converter to multiplex the output signals of the sets of receive channels before analog to digital conversion to enhance measurement throughput.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for combining return signals from multiple channels of a LIDAR measurement system onto the input of a single channel of an analog to digital converter are described herein.

Figure 1:
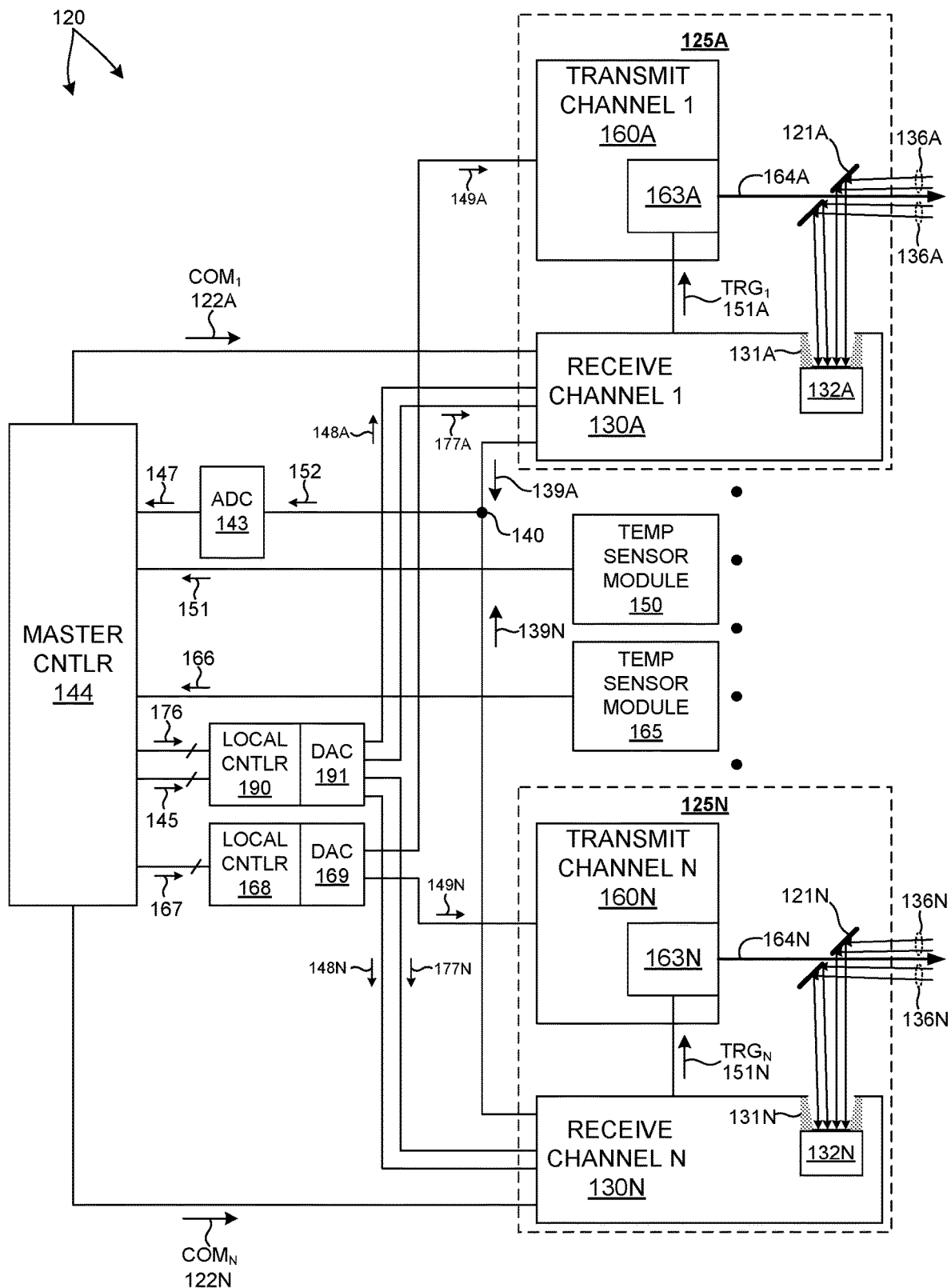
FIG. 1 is a diagram illustrative of a multiple channel LIDAR measurement system 120 in one embodiment.

FIG. 1 depicts a multiple channel LIDAR measurement system 120 in one embodiment. LIDAR measurement system 120 includes a master controller 190 and N LIDAR measurement channels 125A-N, where N is any positive, integer number. Each channel of LIDAR measurement system 120 includes a transmit channel (e.g., transmit channels 160A-N) and a corresponding receive channel (e.g., receive channels 130A-N).

As depicted in FIG. 1, each LIDAR transmit channel 160A-N includes an illumination source 163A-N. An illumination driver of each transmit channel 160A-N causes each corresponding illumination source 163A-N to emit a measurement pulse of illumination light 164A-N in response to a pulse trigger signal 151A-N received from corresponding receive channel 130A-N. Each measurement pulse of illumination light 164A-N passes through mirror element 121A-N and illuminates a volume of the surrounding environment. Each amount of return light 136A-N reflected from object(s) at each illuminated location in the surrounding environment is incident on corresponding mirror elements 121A-N. An overmold lens 131A-N is mounted over each photodetector 132A-N, respectively. Each overmold lens 131A-N includes a conical cavity that corresponds with the ray acceptance cone of return light 136A-N, respectively. Return light 136A-N is reflected from mirrors 121A-N to corresponding photodetectors 132A-N, respectively.

As depicted in FIG. 1, illumination light 164A-N emitted from each channel of LIDAR measurement system 120 and corresponding return measurement light 136A-N directed toward LIDAR measurement system 120 share a common optical path.

As depicted in FIG. 1, each illumination source 163A-N is located outside the field of view of each photodetector. Illumination light 164A-N from illumination sources 163A-N is injected into the corresponding detector reception cone through an opening in mirrors 121A-N, respectively.

In some embodiments, each illumination source 163A-N is laser based (e.g., laser diode). In some embodiments, each illumination source is based on one or more light emitting diodes. In general, any suitable pulsed illumination source may be contemplated.

Master controller 144 is configured to generate pulse command signals 122A-N communicated to receive channels 130A-N, respectively. In these embodiments, master controller 144 communicates a pulse command signal to each different LIDAR measurement channel. In this manner, master controller 144 coordinates the timing of LIDAR measurements performed by any number of LIDAR measurement channels. Each pulse command signal is a digital signal generated by master controller 144. Thus, the timing of each pulse command signal is determined by a clock associated with master controller 144.

In some embodiments, each pulse command signal 122A-N is directly used to trigger pulse generation by transmit channels 160A-N and data acquisition by each corresponding receive channels 130A-N, respectively. However, transmit channels 160A-N and receive channels 130A-N do not share the same clock as master controller 144. For this reason, precise estimation of time of flight becomes much more computationally tedious when a pulse command signal is directly used to trigger pulse generation and data acquisition.

In some other embodiments, each receive channel 130A-N receives a pulse command signal 122A-N and generates corresponding pulse trigger signals 151A-N, in response to pulse command signals 122A-N, respectively. Each pulse trigger signal 151A-N is communicated to transmit channel 160A-N and directly triggers an illumination driver associated with each transmit channel to generate a corresponding pulse of illumination light 164A-N. In addition, each pulse trigger signal 151A-N directly triggers data acquisition of return signals 136A-N and associated time of flight calculations. In this manner, pulse trigger signals 151A-N generated based on the internal clock of return signal receivers of each receive channel 130A-N, respectively, are employed to trigger both pulse generation and return pulse data acquisition for a particular LIDAR measurement channel. This ensures precise synchronization of pulse generation and return pulse acquisition which enables precise time of flight calculations by time-to-digital conversion.

In one aspect, the outputs of each receive channel 130A-N are electrically coupled (e.g., at voltage node 140). In this manner, the outputs of receive channels 130A-N are effectively summed at the input of the analog to digital converter 143.

Figure 2:
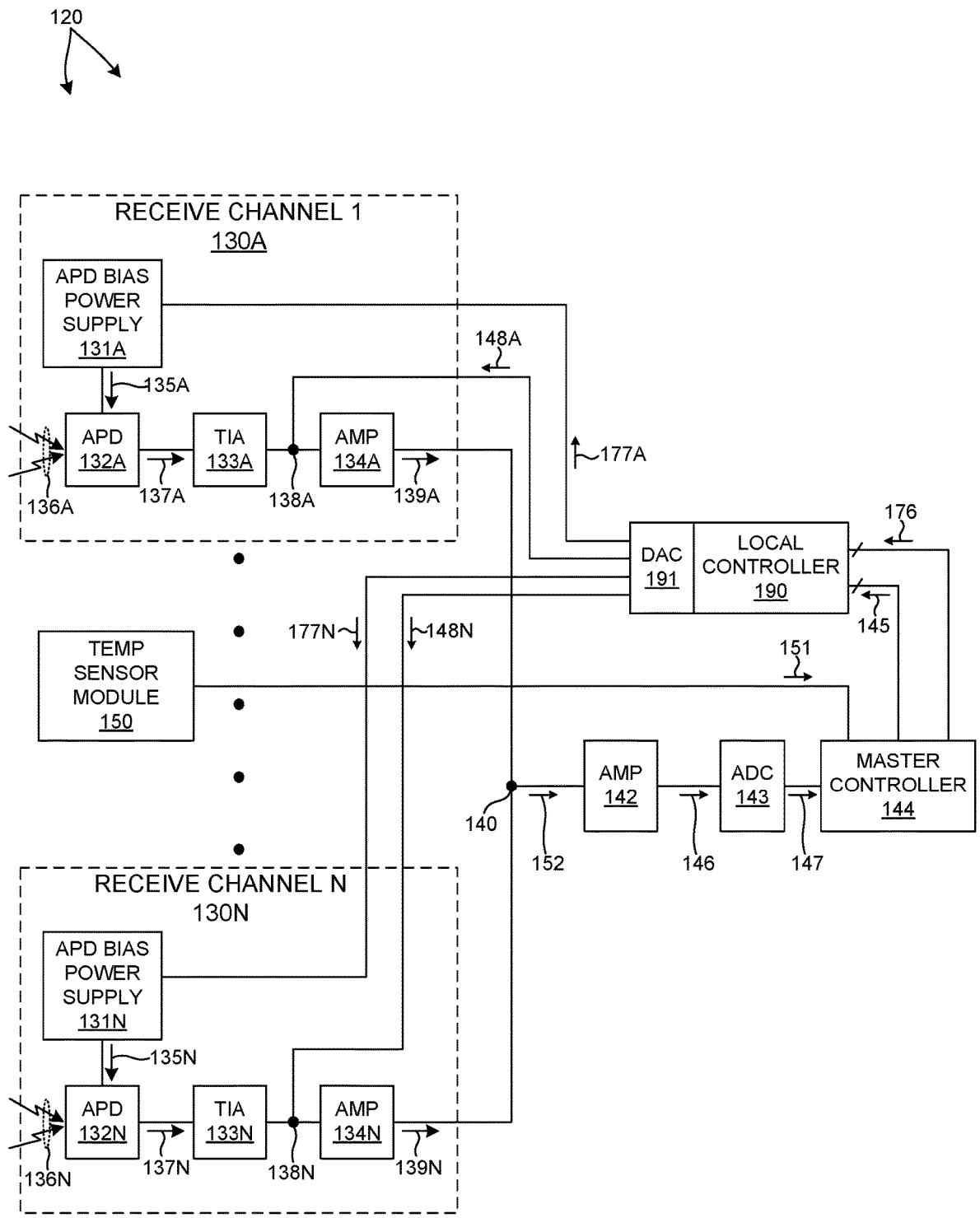
FIG. 2 depicts a set of N receive channels of multiple channel LIDAR measurement system 120 in one embodiment.

FIG. 2 depicts a more detailed view of the receive channels of LIDAR measurement system 120 in one embodiment. Like numbered elements described with respect to FIG. 1 are analogous to those illustrated in FIG. 2, and vice-versa. As depicted in FIG. 2, LIDAR measurement system 120 includes a number of analog receive channels 130A-N, an analog to digital converter (ADC) 143, and a master controller 144.

As depicted in FIG. 2, each analog receive channel 130A-N includes a photodetector (e.g., an avalanche photodiode 132A-N, or other photosensitive device) and a trans-impedance amplifier (TIA) 133A-N. In addition, each analog receive channel includes one or more secondary amplifier stages 134A-N. However, in general, secondary amplifier stages 134A-N are optional.

In the embodiment depicted in FIG. 2, incoming light 136A is detected by APD 132A. In response to an incoming return pulse of light 136A, APD 132A generates a current signal 137A. TIA 133A receives current signal 137A and generates a voltage signal present at voltage node 138A. In the embodiment depicted in FIG. 2, TIA 133A generates a single ended voltage output. However, in some other embodiments, TIA 133A generates a differential voltage output. Amplifier 134A amplifies the voltage signal at node 138A and generates an output signal 139A. In some embodiments the output of amplifier 134A is a current signal. However, in some other embodiments, the output of amplifier 134A is a voltage signal. As depicted in FIG. 2, output signal 139A is the output of receive channel 130A generated in response to detected return pulse of light 136A. Similarly, each receive channel 130A-N generates an output signal 139A-N indicative of the detected return pulse of light 136A-N detected at each receive channel 130A-N, respectively.

As depicted in FIG. 2, the outputs of each receive channel 130A-N are electrically coupled at voltage node 140. In this manner, the outputs of receive channels 130A-N are effectively summed. Combined output signal 152 is an analog signal indicative of the output of each receive channel 130A-N in the same sequence as the sequence of laser pulse emission associated with each receive channel 130A-N.

The summed signals are subsequently provided as input to a single channel of an analog to digital converter 143, either directly, or after further processing (e.g., amplification by amplifier 142). In the embodiment depicted in FIG. 2, the summed output signal 152 is amplified by amplifier 142. Amplified signal 146 is converted to a digital signal 147 by ADC 143. Digital signal 147 is received by master controller 144.

Alternatively, in the absence of amplifier 142, the outputs of receive channels 130A-N are effectively summed at the input of ADC 143 (e.g., as depicted in FIG. 1). In general, amplifier 142 is optional.

In a further aspect, the electrical elements in each electrical path from a photodetector (e.g., APD 132A-N) to ADC 143 are direct current (DC) coupled to one another. In other words, for each receive channel 130A-N, there are no explicitly formed energy storage elements that act as DC signal blocking elements (e.g., capacitors, etc.) between any of APD 132A-N, TIA 133A-N, amplifier 134A-N, amplifier 142, and ADC 143; only electrical conductors. In the embodiment depicted in FIG. 2, each APD 132A-N is DC coupled to a corresponding TIA 133A-N. Each TIA 133A-N is DC coupled to a corresponding amplifier 134A-N. Each amplifier 134A-N is DC coupled to amplifier 142. Amplifier 142 is DC coupled to ADC 143.

In another aspect, a DC offset voltage is provided at the output of the TIA associated with each receive channel.

In the embodiment depicted in FIG. 2, master controller 144 communicates a command signal 145 to local controller 190. Command signal 145 is indicative of a desired DC voltage offset at the output of each TIA of receive channels 130A-N. Local controller 190, in turn, communicates DC offset voltage signals 148A-N to voltage nodes 138A-N (via digital to analog converter 191) at the outputs of TIA 133A-N, respectively. In some embodiments, master controller 144 and local controller 190 are separate devices. However, in some other embodiments, a single device is employed to generate and communicate DC offset voltage signals to the output of each TIA. In some embodiments, master controller 144 is a field programmable gate array (FPGA) device and local controller 190 is a complex programmable logic device (CPLD). However, in general, any suitable computing device may be employed.

In some embodiments, master controller 144 generates command signal 145 based on the quality of measured signal 147. In some examples, command signal 145 is generated to maximize the signal to noise ratio of the digital signals 147 generated by ADC 143. In some examples, command signal 145 is generated to offset DC noise signals present in the operating environment of the LIDAR device. By offsetting DC noise, the full scale of ADC 143 is available for dynamic measurement. This increases signal to noise ratio.

In another aspect, the temperature associated with one or more receive channels is measured. In a further aspect, the measured temperature is employed to adjust a bias voltage supplied to each APD.

In the embodiment depicted in FIG. 2, a temperature sensor module is located in close proximity to one or more elements of receive channels 130A-N (i.e., elements of a receive subsystem including receive channels 130A-N). In one example, temperature sensor module 150 is located within 40 millimeters of a receive channel (e.g., any of receive channels 130A-N). However, in general, a temperature sensor may be located at any suitable distance from one or more receive channels. Temperature sensor module 150 measures temperature where module 150 is located and communicates a digital signal 151 indicative of the measured temperature to master controller 144 (e.g., over a serial peripheral interface). In response to the measured temperature, master controller communicates a command signal 176 to local controller 190. Command signal 176 is indicative of a desired bias voltage provided to each APD of receive channels 130A-N. Local controller 190, in turn, communicates bias voltage command signals 177A-N to APD bias power supplies 131A-D, respectively (via digital to analog converter 191). Each APD bias power supply 131A-N adjusts a bias voltage signal 135A-N provided to each APD 132A-N, respectively.

In some embodiments, master controller 144 and local controller 190 are separate devices. However, in some other embodiments, a single device is employed to generate and communicate bias voltage signals to each APD bias power supply.

Master controller 144 generates command signal 176 based on the measured temperature associated with one or more receive channels. Command signal 176 is generated to save power and improve measurement consistency.

In another aspect, the temperature associated with one or more transmit channels is measured. In a further aspect, the measured temperature is employed to adjust a bias voltage supplied to each illumination source.

Figure 3:
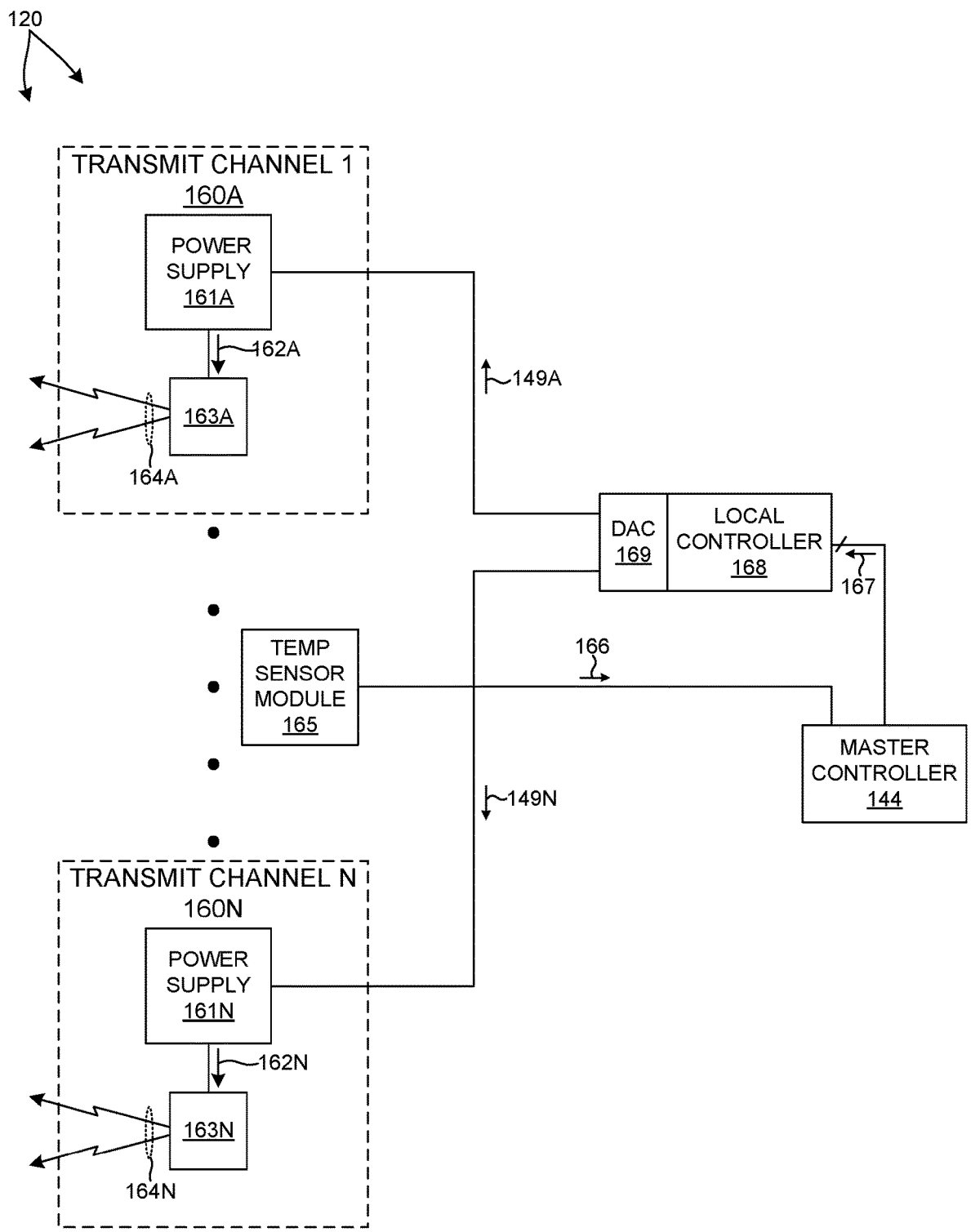
FIG. 3 depicts a set of N transmit channels of multiple channel LIDAR measurement system 120 in one embodiment.

FIG. 3 depicts a more detailed view of the transmit channels of LIDAR measurement system 120 in one embodiment. Like numbered elements described with respect to FIG. 1 are analogous to those illustrated in FIG. 3, and vice-versa. FIG. 3 depicts a set of N transmit channels 160A-N (where N can be any positive integer number). Each transmit channel includes a power supply 161A-N and an illumination source 163A-N (e.g., a laser diode). Each illumination source 163A-N emits a pulse of light 164A-N. Light reflected from the surrounding environment is detected by a corresponding receiver channel (e.g., receiver channels 130A-N depicted in FIG. 2). The time of flight associated each pulse of light determines the distance between the LIDAR device and the detected object in the surrounding environment.

As depicted in FIG. 3, a temperature sensor module 165 is located in close proximity to one or more elements of transmit channels 160A-N (i.e., elements of a transmit subsystem including transmit channels 160A-N). In one example, temperature sensor module 165 is located within 40 millimeters of a transmit channel 160A-N. However, in general, a temperature sensor may be located at any suitable distance from one or more transmit channels. Temperature sensor module 165 measures temperature where module 165 is located and communicates a digital signal 166 indicative of the measured temperature to master controller 144 (e.g., over a serial peripheral interface). In response to the measured temperature, master controller 144 communicates a command signal 167 to local controller 168. Command signal 167 is indicative of a desired bias voltage provided to each laser diode of transmit channels 160A-N. Local controller 168, in turn, communicates bias voltage command signals 149A-N to power supply 161A-D, respectively (via digital to analog converter 169). Each power supply 161A-N adjusts a bias voltage signal 162A-N provided to each laser diode 163A-N, respectively.

In some embodiments, master controller 144 and local controller 168 are separate devices. However, in some other embodiments, a single device is employed to generate and communicate bias voltage signals to each bias power supply.

In some embodiments, master controller 144 generates command signal 167 based on the measured temperature associated with one or more transmit channels and also the level of signal detected at each corresponding receive channel (e.g., signals 139A-N).

In a further aspect, a multiplexer is disposed between multiple sets of receive channels and ADC 143 to enhance measurement throughput.

Figure 4:
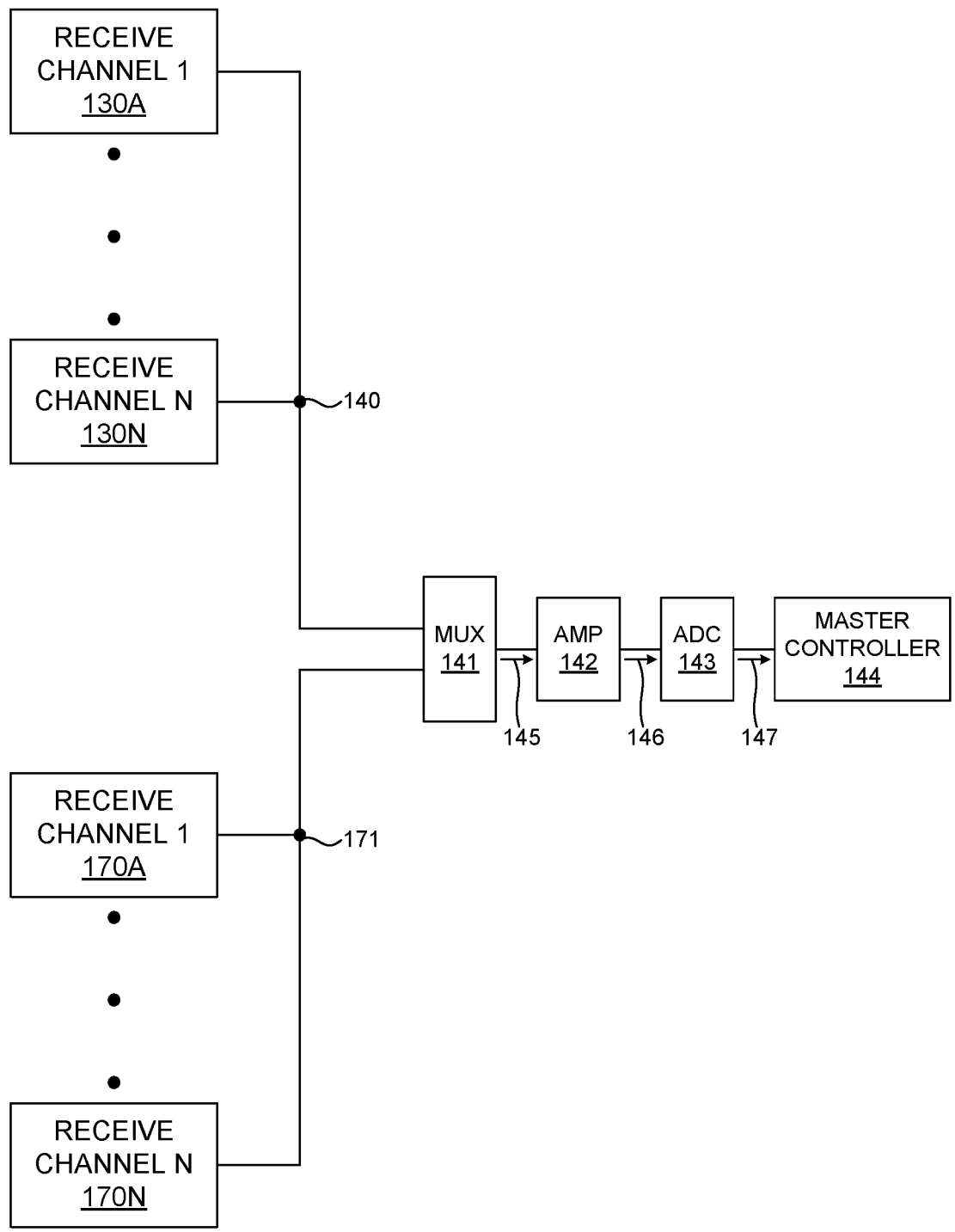
FIG. 4 depicts two sets of multiple receive channels of a multiple channel LIDAR measurement system in another embodiment.

FIG. 4 depicts two sets of multiple receive channels of a multiple channel LIDAR measurement system in another embodiment. Like numbered elements described with respect to FIG. 1 are analogous to those illustrated in FIG. 4, and vice-versa. FIG. 4 depicts receive channels 130A-N and an additional set of receive channels 170A-N. The outputs of receive channels 130A-N are electrically coupled at voltage node 140 as described hereinbefore. Similarly, the outputs of receive channels 170A-N are electrically coupled at voltage node 171. In the embodiment depicted in FIG. 4, a two channel multiplexer 141 receives the summed output signals 140 and 171 and generates multiplexed output 145. Multiplexed output 145 is amplified by amplifier 142. Amplified signal 146 is converted to a digital signal 147 by a single channel of ADC 143. Digital signal 147 is received by master controller 144. In this manner, the outputs of 2N receive channels are combined onto a single ADC channel.

In one embodiment, each receive channel is fabricated onto a single printed circuit board. A group of N boards are electrically coupled to another printed circuit board that includes multiplexer 141, amplifier 142, local controller 190, DAC 191, and temperature sensor module 150. ADC 143 and master controller 144 are assembled on yet another printed circuit board. Similarly, each transmit channel is fabricated onto a single printed circuit board. A group of N boards are electrically coupled to another printed circuit board that includes temperature sensor module 165, local controller 168, and DAC 169.

In some embodiments, illumination drivers, illumination sources 163A-N, photodetectors 132A-N, and return signal receivers are mounted, either directly or indirectly, to a common substrate (e.g., printed circuit board) that provides mechanical support and electrical connectivity among the elements.

In general, any of the power supplies described herein may be mounted to a separate substrate and electrically coupled to the various electronic elements in any suitable manner. Alternatively, any of the power supplies described herein may be integrated with other electronic elements in any suitable manner.

The power supplies described herein may be configured to supply electrical power specified as voltage or current. Hence, any electrical power source described herein as a voltage source or a current source may be contemplated as an equivalent current source or voltage source, respectively.

Figure 5:
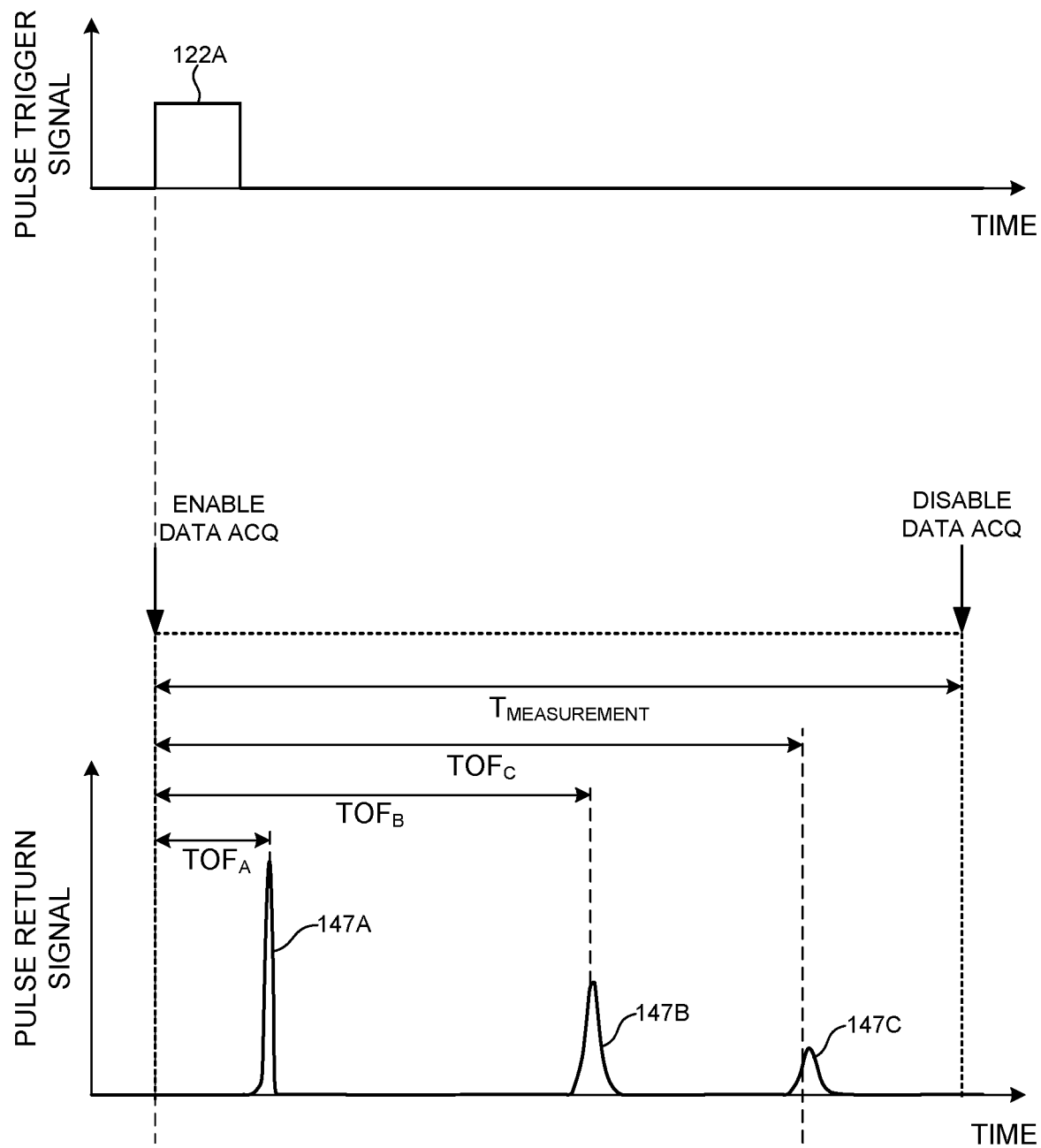
FIG. 5 depicts an illustration of the timing associated with the emission of a measurement pulse from a measurement channel of LIDAR measurement device 120 and capture of the returning measurement pulse.

FIG. 5 depicts an illustration of the timing associated with the emission of a measurement pulse from an LIDAR measurement device and capture of the returning measurement pulse. As depicted in FIG. 5, a measurement is initiated by the rising edge of pulse trigger signal 122A generated, for example, by master controller 144. A measurement window (i.e., a period of time over which collected return signal data is associated with a particular measurement pulse) is initiated by enabling data acquisition at the rising edge of pulse trigger signal 122A. The duration of the measurement window, $T_{measurement}$, corresponds to the window of time when a return signal is expected in response to the emission of a measurement pulse sequence. In some examples, the measurement window is enabled at the rising edge of pulse trigger signal 122A and is disabled at a time corresponding to the time of flight of light over a distance that is approximately twice the range of the LIDAR system. In this manner, the measurement window is open to collect return light from objects adjacent to the LIDAR system (i.e., negligible time of flight) to objects that are located at the maximum range of the LIDAR system. In this manner, all other light that cannot possibly contribute to useful return signal is rejected.

As depicted in FIG. 5, return signal 147 includes three return measurement pulses 147A-C that correspond with the emitted measurement pulse. Any of these instances may be reported as potentially valid distance measurements by the LIDAR system.

In another aspect, a master controller is configured to generate a plurality of pulse command signals, each communicated to different LIDAR measurement channels.

Figure 6:
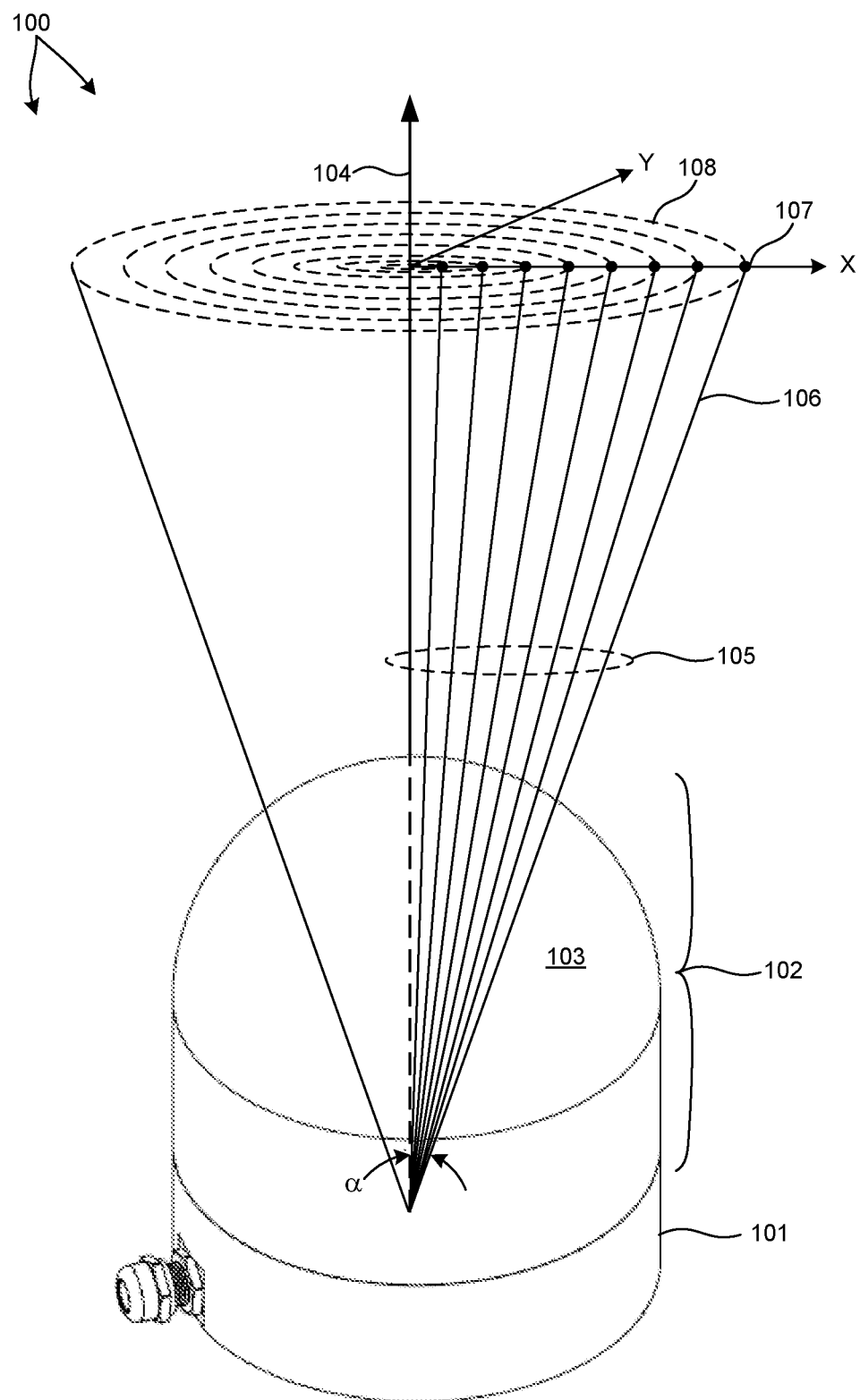
FIG. 6 is a diagram illustrative of an embodiment of a 3-D LIDAR system 100 in one exemplary operational scenario.
Figure 7:
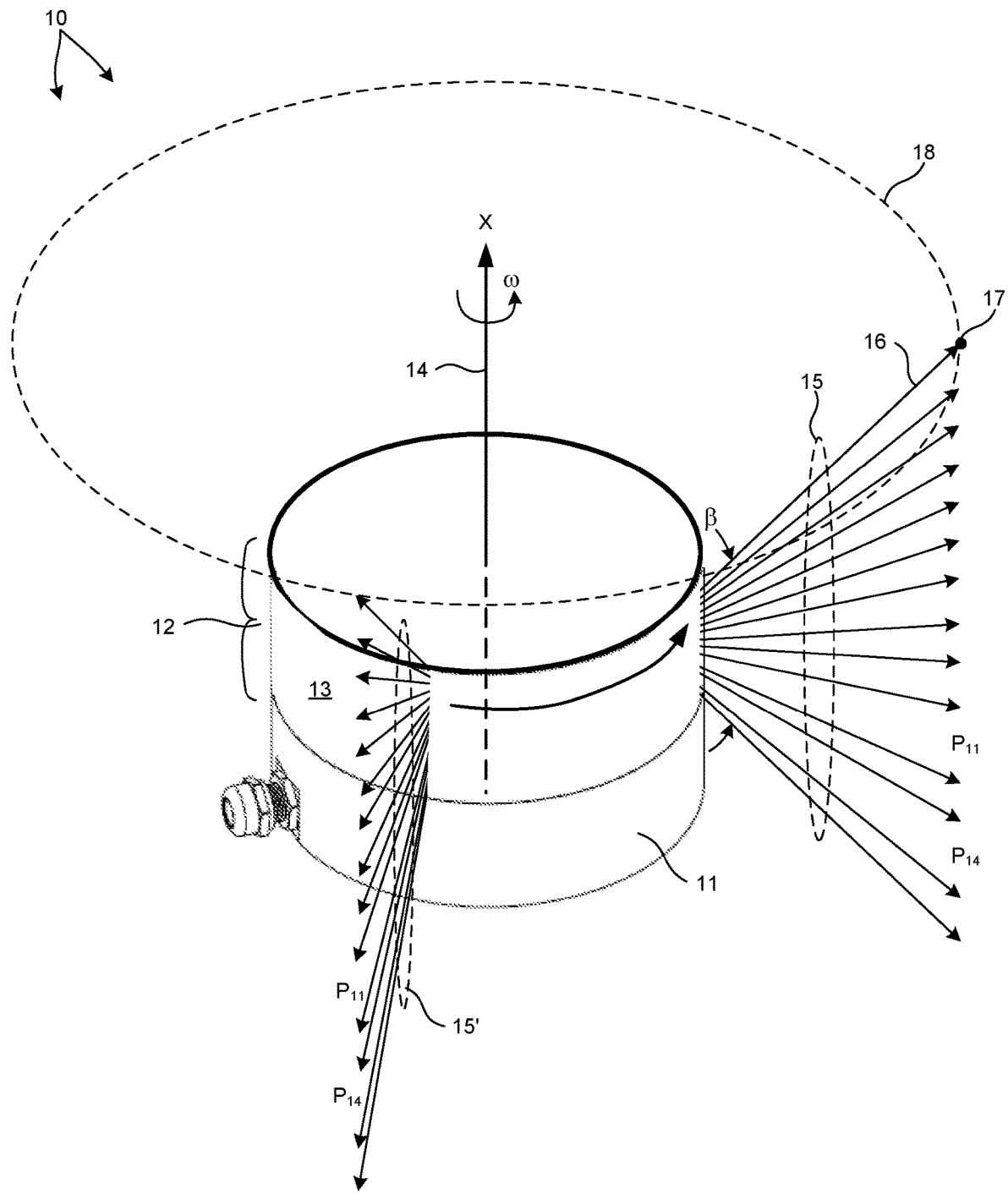
FIG. 7 is a diagram illustrative of another embodiment of a 3-D LIDAR system 10 in one exemplary operational scenario.
Figure 8:
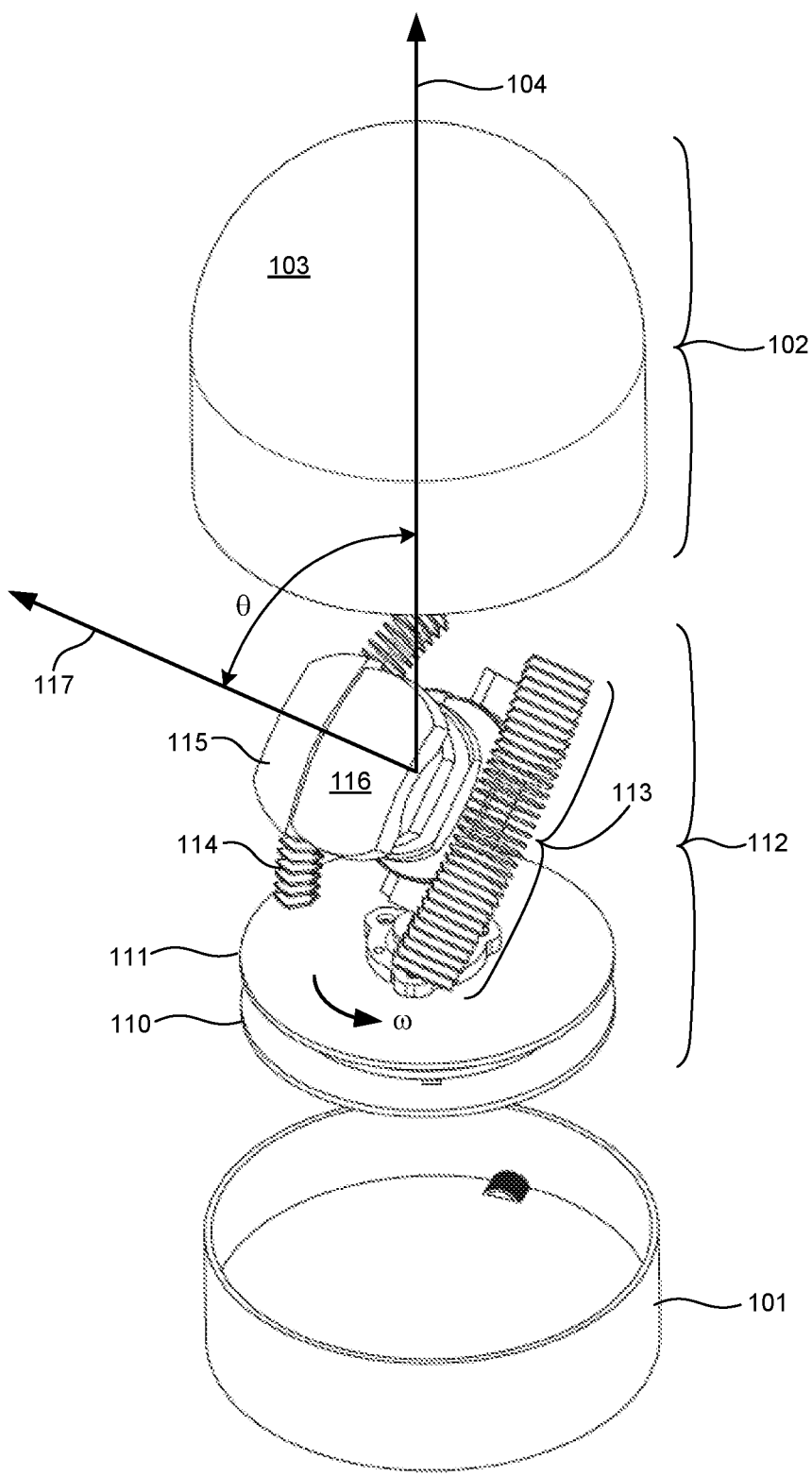
FIG. 8 depicts a diagram illustrative of an exploded view of 3-D LIDAR system 100 in one exemplary embodiment.

FIGS. 6-8 depict 3-D LIDAR systems that include multiple LIDAR measurement channels. In some embodiments, a delay time is set between the firing of each LIDAR measurement channel. In some examples, the delay time is greater than the time of flight of the measurement pulse sequence to and from an object located at the maximum range of the LIDAR device. In this manner, there is no cross-talk among any of the LIDAR measurement channels. In some other examples, a measurement pulse is emitted from one LIDAR measurement channel before a measurement pulse emitted from another LIDAR measurement channel has had time to return to the LIDAR device. In these embodiments, care is taken to ensure that there is sufficient spatial separation between the areas of the surrounding environment interrogated by each beam to avoid cross-talk.

FIG. 6 is a diagram illustrative of an embodiment of a 3-D LIDAR system 100 in one exemplary operational scenario. 3-D LIDAR system 100 includes a lower housing 101 and an upper housing 102 that includes a domed shell element 103 constructed from a material that is transparent to infrared light (e.g., light having a wavelength within the spectral range of 700 to 1,700 nanometers). In one example, domed shell element 103 is transparent to light having a wavelengths centered at 905 nanometers.

As depicted in FIG. 6, a plurality of beams of light 105 are emitted from 3-D LIDAR system 100 through domed shell element 103 over an angular range, α, measured from a central axis 104. In the embodiment depicted in FIG. 5, each beam of light is projected onto a plane defined by the x and y axes at a plurality of different locations spaced apart from one another. For example, beam 106 is projected onto the xy plane at location 107.

In the embodiment depicted in FIG. 6, 3-D LIDAR system 100 is configured to scan each of the plurality of beams of light 105 about central axis 104. Each beam of light projected onto the xy plane traces a circular pattern centered about the intersection point of the central axis 104 and the xy plane. For example, over time, beam 106 projected onto the xy plane traces out a circular trajectory 108 centered about central axis 104.

FIG. 7 is a diagram illustrative of another embodiment of a 3-D LIDAR system 10 in one exemplary operational scenario. 3-D LIDAR system 10 includes a lower housing 11 and an upper housing 12 that includes a cylindrical shell element 13 constructed from a material that is transparent to infrared light (e.g., light having a wavelength within the spectral range of 700 to 1,700 nanometers). In one example, cylindrical shell element 13 is transparent to light having a wavelengths centered at 905 nanometers.

As depicted in FIG. 8, a plurality of beams of light 15 are emitted from 3-D LIDAR system 10 through cylindrical shell element 13 over an angular range, β. In the embodiment depicted in FIG. 8, the chief ray of each beam of light is illustrated. Each beam of light is projected outward into the surrounding environment in a plurality of different directions. For example, beam 16 is projected onto location 17 in the surrounding environment. In some embodiments, each beam of light emitted from system 10 diverges slightly. In one example, a beam of light emitted from system 10 illuminates a spot size of 20 centimeters in diameter at a distance of 100 meters from system 10. In this manner, each beam of illumination light is a cone of illumination light emitted from system 10.

In the embodiment depicted in FIG. 7, 3-D LIDAR system 10 is configured to scan each of the plurality of beams of light 15 about central axis 14. For purposes of illustration, beams of light 15 are illustrated in one angular orientation relative to a non-rotating coordinate frame of 3-D LIDAR system 10 and beams of light 15' are illustrated in another angular orientation relative to the non-rotating coordinate frame. As the beams of light 15 rotate about central axis 14, each beam of light projected into the surrounding environment (e.g., each cone of illumination light associated with each beam) illuminates a volume of the environment corresponding the cone shaped illumination beam as it is swept around central axis 14.

FIG. 8 depicts an exploded view of 3-D LIDAR system 100 in one exemplary embodiment. 3-D LIDAR system 100 further includes a light emission/collection engine 112 that rotates about central axis 104. As depicted in FIG. 8, a central optical axis 117 of light emission/collection engine 112 is tilted at an angle, θ, with respect to central axis 104. 3-D LIDAR system 100 includes a stationary electronics board 110 mounted in a fixed position with respect to lower housing 101. Rotating electronics board 111 is disposed above stationary electronics board 110 and is configured to rotate with respect to stationary electronics board 110 at a predetermined rotational velocity (e.g., more than 200 revolutions per minute). Electrical power and electronic signals are communicated between stationary electronics board 110 and rotating electronics board 111 over one or more transformer elements, capacitive elements, or optical elements, resulting in a contactless transmission of these signals. Light emission/collection engine 112 is fixedly positioned with respect to the rotating electronics board 111, and thus rotates about central axis 104 at the predetermined angular velocity, ω.

As depicted in FIG. 8, light emission/collection engine 112 includes an array of printed circuit boards 114, each including a transmit channel (e.g., transmit channels 160A-N). Light emitted from the illumination source associated with each of the transmit channels is directed toward a mirror (not shown). Light reflected from the mirror passes through a series of illumination optics 115 that collimate the emitted light into the array of beams of light 105 that are emitted from 3-D LIDAR system 100 as depicted in FIG. 6. In general, any number of light emitting elements can be arranged to simultaneously, or substantially simultaneously, emit any number of light beams from 3-D LIDAR system 100. In addition, any number of light emitting elements can be arranged to sequentially emit any number of light beams from 3-D LIDAR system 100. In one embodiment, two or more light emitting elements are triggered to emit light substantially simultaneously, and then after a programmed period of time has elapsed, another two or more light emitting elements are triggered to emit light substantially simultaneously. Light reflected from objects in the environment is collected by collection optics 116. Collected light associated with each illumination beam passes through collection optics 116 where it is focused onto each respective detecting element of an array of printed circuit boards 113, each including a receive channel (e.g., receive channels 130A-N). After passing through collection optics 116, the collected light is reflected from a mirror (not shown) onto each detector element. In practice, crosstalk among each measurement channel limits the number of channels that can be triggered simultaneously. However, to maximize imaging resolution, it is desirable to trigger as many channels as possible, simultaneously, so that time of flight measurements are obtained from many channels at the same time, rather than sequentially.

Figure 9:
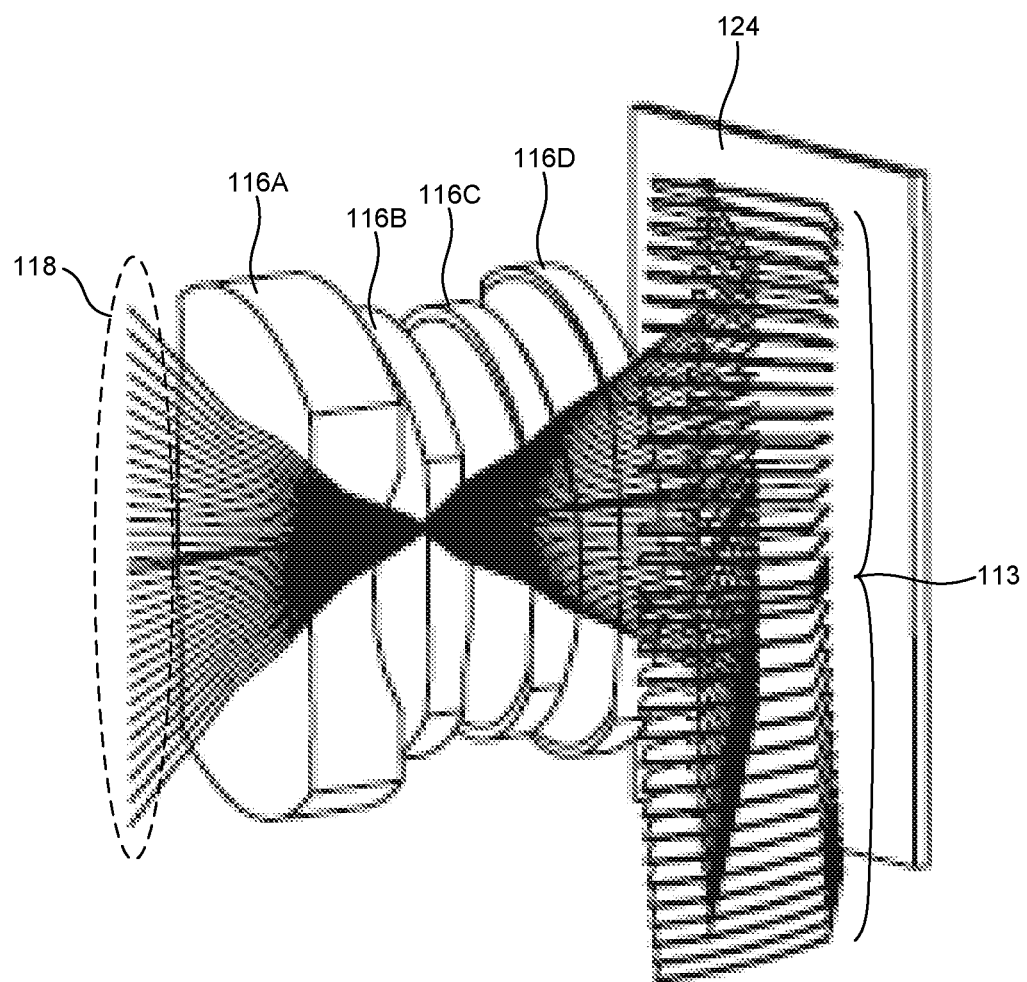
FIG. 9 depicts a view of optical elements 116 of 3-D LIDAR system 100 in greater detail.

FIG. 9 depicts a view of optical elements 116 in greater detail. As depicted in FIG. 9, optical elements 116 include four lens elements 116A-D arranged to focus collected light 118 onto each detector of the array of receive channels 113. In the embodiment depicted in FIG. 9, light passing through optics 116 is reflected from mirror 124 and is directed onto each detector of the array of receive channels 113. In some embodiments, one or more of the optical elements 116 is constructed from one or more materials that absorb light outside of a predetermined wavelength range. The predetermined wavelength range includes the wavelengths of light emitted by the array of receive channels 113. In one example, one or more of the lens elements are constructed from a plastic material that includes a colorant additive to absorb light having wavelengths less than infrared light generated by each of the array of receive channels 113. In one example, the colorant is Epolight 7276A available from Aako BV (The Netherlands). In general, any number of different colorants can be added to any of the plastic lens elements of optics 116 to filter out undesired spectra.

Figure 10:
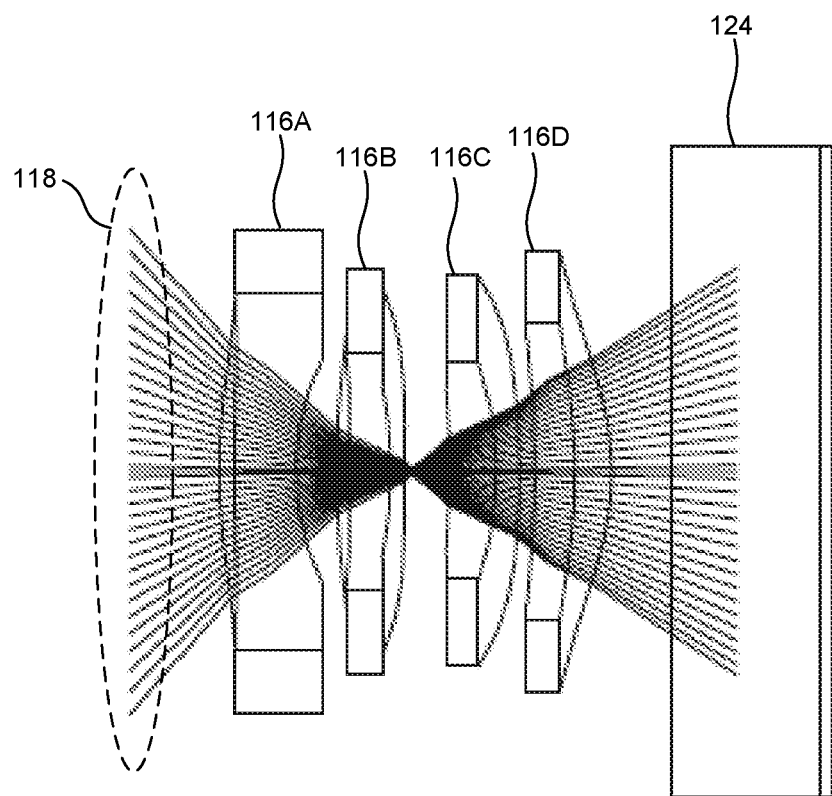
FIG. 10 depicts a cutaway view of optics 116 of 3-D LIDAR system 100 to illustrate the shaping of each beam of collected light 118.

FIG. 10 depicts a cutaway view of optics 116 to illustrate the shaping of each beam of collected light 118.

In this manner, a LIDAR system, such as 3-D LIDAR system 10 depicted in FIG. 7, and system 100, depicted in FIG. 6, includes a plurality of LIDAR measurement channels each emitting a pulsed beam of illumination light from the LIDAR device into the surrounding environment and measuring return light reflected from objects in the surrounding environment.

In some embodiments, such as the embodiments described with reference to FIG. 6 and FIG. 7, an array of LIDAR measurement channels is mounted to a rotating frame of the LIDAR device. This rotating frame rotates with respect to a base frame of the LIDAR device. However, in general, an array of LIDAR measurement channels may be movable in any suitable manner (e.g., gimbal, pan/tilt, etc.) or fixed with respect to a base frame of the LIDAR device.

In some other embodiments, each LIDAR measurement channel includes a beam directing element (e.g., a scanning mirror, MEMS mirror etc.) that scans the illumination beam generated by the LIDAR measurement channel.

In some other embodiments, two or more LIDAR measurement channels each emit a beam of illumination light toward a scanning mirror device (e.g., MEMS mirror) that reflects the beams into the surrounding environment in different directions.

In a further aspect, one or more LIDAR measurement channels are in optical communication with an optical phase modulation device that directs the illumination beam(s) generated by the one or more LIDAR measurement channels in different directions. The optical phase modulation device is an active device that receives a control signal that causes the optical phase modulation device to change state and thus change the direction of light diffracted from the optical phase modulation device. In this manner, the illumination beam(s) generated by the one or more integrated LIDAR devices are scanned through a number of different orientations and effectively interrogate the surrounding 3-D environment under measurement. The diffracted beams projected into the surrounding environment interact with objects in the environment. Each respective LIDAR measurement channel measures the distance between the LIDAR measurement system and the detected object based on return light collected from the object. The optical phase modulation device is disposed in the optical path between the LIDAR measurement channel and an object under measurement in the surrounding environment. Thus, both illumination light and corresponding return light pass through the optical phase modulation device.

Figure 11:
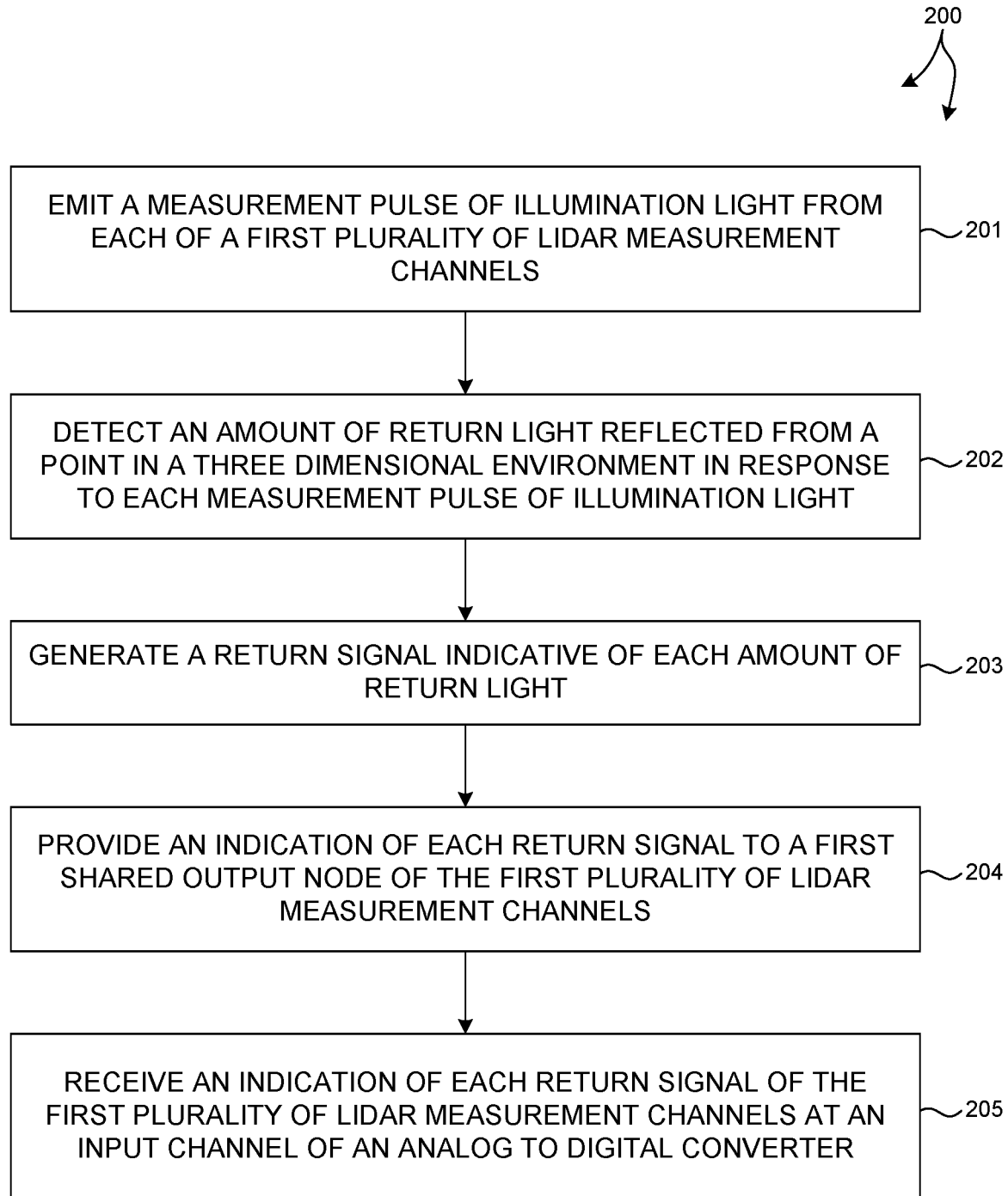
FIG. 11 depicts a flowchart illustrative of a method 200 of performing a LIDAR measurement by a multiple channel LIDAR measurement system in at least one novel aspect.

FIG. 11 illustrates a flowchart of a method 200 suitable for implementation by multiple channel LIDAR measurement system as described herein. In some embodiments, multiple channel LIDAR measurement system 120 is operable in accordance with method 100 illustrated in FIG. 11. However, in general, the execution of method 200 is not limited to the embodiments of multiple channel LIDAR measurement system 120 described with reference to FIG. 1. These illustrations and corresponding explanation are provided by way of example as many other embodiments and operational examples may be contemplated.

In block 201, a measurement pulse of illumination light is emitted from each of a first plurality of LIDAR measurement channels.

In block 202, an amount of return light reflected from a point in a three dimensional environment in response to each measurement pulse of illumination light is detected.

In block 203, a return signal indicative of each amount of return light is generated.

In block 204, an indication of each return signal is provided to a first shared output node of the first plurality of LIDAR measurement channels.

In block 205, an indication of each return signal of the first plurality of LIDAR measurement channels is received at an input channel of an analog to digital converter.

A computing system as described herein may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions implementing methods such as those described herein may be transmitted over a transmission medium such as a wire, cable, or wireless transmission link. Program instructions are stored in a computer readable medium. Exemplary computer-readable media include read-only memory, a random access memory, a magnetic or optical disk, or a magnetic tape.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

What is claimed is:

1. A LIDAR measurement system, comprising:
   a first plurality of LIDAR measurement channels each comprising:
      an illumination source operable to emit a measurement beam of illumination light in response to a first command signal;
      a photodetector configured to detect an amount of return light reflected from a surface in an environment in response to the measurement beam of illumination light; and
      a return signal receiver configured to, in response to the first command signal, generate a return signal indicative of the detected amount of return light and provide the return signal to a first shared output node of the first plurality of LIDAR measurement channels which effectively sums the outputs of the first plurality of LIDAR measurement channels, wherein the return signal receiver includes a respective amplifier; and
   a controller configured to generate the first command signal to cause the illumination source to emit the measurement beam and the return signal receiver to generate the return signal, and to generate a second command signal to adjust a bias voltage supplied to one or more of the illumination sources or one or more of the photodetectors of one or more of the first plurality of LIDAR measurement channels.

2. The LIDAR measurement system of claim 1, further comprising:
   a second plurality of LIDAR measurement channels each comprising:
      a second illumination source operable to emit a second measurement beam of illumination light;
      a second photodetector configured to detect a second amount of return light reflected from a second surface in the environment in response to the second measurement beam of illumination light; and
      a second return signal receiver configured to generate a second return signal indicative of the detected second amount of return light and to provide the second return signal to a second shared output node of the second plurality of LIDAR measurement channels; and
   an analog multiplexer having a first input channel coupled to the first shared output node, a second input channel coupled to the second shared output node, and an output channel coupled to an input channel of an analog to digital converter, wherein the analog to digital converter is configured to receive each second return signal of the second plurality of LIDAR measurement channels provided to the second shared output node at the input channel of the analog to digital converter.

3. The LIDAR measurement system of claim 2, wherein the analog multiplexer is configured to receive the return signals of the first plurality of LIDAR measurement channels provided to the first shared output node at the first input channel, receive the return signals of the second plurality of LIDAR measurement channels provided to the second shared output node at the second input channel, and generate a multiplexed output signal indicative of the return signals of the first plurality and the second plurality of LIDAR measurement channels at the output channel.

4. The LIDAR measurement system of claim 1, the first plurality of LIDAR measurement channels each further comprising:
   an illumination bias power supply coupled to the one or more illumination sources, wherein the illumination bias power supply is configured to adjust the bias voltage supplied to the one or more illumination sources in response to the second command signal.

5. The LIDAR measurement system of claim 4, further comprising a temperature sensor disposed in close proximity to at least one of the one or more illumination sources of the first plurality of LIDAR measurement channels,
   wherein the controller is electrically coupled to the temperature sensor and the illumination bias power supply,
   wherein the controller is configured to receive an indication of a transmit subsystem temperature measured from the temperature sensor,
   wherein the second command signal indicates a desired bias voltage, and
   wherein the controller is configured to generate the second command signal based at least in part on the measured transmit subsystem temperature.

6. The LIDAR measurement system of claim 4, wherein the controller is electrically coupled to the illumination bias power supply associated with the one or more illumination sources, wherein the controller is configured to receive an indication of each return signal of the one or more LIDAR measurement channels and generate the second command signal indicative of a desired bias voltage based at least in part on the respective return signals corresponding with each of the one or more LIDAR measurement channels.

7. The LIDAR measurement system of claim 1, wherein the illumination source, the photodetector, and the return signal receiver of each of the first plurality of LIDAR measurement channels are mounted on a common substrate.

8. The LIDAR measurement system of claim 7, wherein the measurement beam of illumination light and the return signal share a common optical path, the first plurality of LIDAR measurement channels each further comprising:
   a beam directing element configured to direct the measurement beam of illumination light from the illumination source to the corresponding photodetector.

9. The LIDAR measurement system of claim 1, wherein the amplifier of the return signal receiver of each of the first plurality of LIDAR measurement channels has an input node and an output node, wherein the input node is coupled to an output of the photodetector of the respective LIDAR measurement channel.

10. The LIDAR measurement system of claim 9, wherein the controller is electrically coupled to the output node of the amplifier of the return signal receiver of each of the first plurality of LIDAR measurement channels, wherein the controller is configured to provide a direct current (DC) offset voltage at the output node of each of the amplifiers.

11. The LIDAR measurement system of claim 10, wherein the LIDAR measurement system is configured to provide the DC offset voltage at the output nodes of the amplifiers to increase signal to noise ratios of corresponding digital signals generated by an analog to digital converter.

12. A LIDAR measurement system, comprising:
a first plurality of LIDAR receive channels each comprising:
a photodetector configured to detect an amount of return light reflected from a surface in an environment in response to a measurement beam of illumination light from an illumination source; and
an amplifier coupled to the photodetector, the amplifier configured to generate a signal indicative of the return light and provide the signal to a first shared output node of the first plurality of LIDAR receive channels which effectively sums the outputs of the first plurality of LIDAR receive channels; and
a controller configured to generate a first command signal to cause the illumination source to emit the measurement beam and the amplifier to generate the signal indicative of the return light, and to generate a second command signal to adjust a bias voltage supplied to one or more of the illumination sources or one or more of the photodetectors of one or more of the first plurality of LIDAR receive channels.

13. The LIDAR measurement system of claim 12, wherein the controller is electrically coupled to an output node of each of the amplifiers of the first plurality of LIDAR receive channels, wherein the controller is configured to provide a direct current (DC) offset voltage at the output node of each of the amplifiers.

14. The LIDAR measurement system of claim 13, wherein the DC offset voltage is provided at the output node of each of the amplifiers to increase signal to noise ratios of corresponding digital signals generated by an analog to digital converter.

15. A method comprising:
with each of a first plurality of LIDAR measurement channels:
emitting, from an illumination source, a measurement beam of illumination light in response to a first command signal;
detecting an amount of return light reflected from a respective surface in an environment in response to the measurement beam of illumination light;
generating, with a return signal receiver including an amplifier and in response to the first command signal, a return signal indicative of the amount of return light; and
providing, by the return signal receiver, the return signal to a first shared output node of the first plurality of LIDAR measurement channels which effectively sums the outputs of the first plurality of LIDAR measurement channels;
generating the first command signal to cause the illumination source to emit the measurement beam and the return signal receiver to generate the return signal; and
generating a second command signal to adjust a bias voltage supplied to one or more of the illumination sources of one or more of the first plurality of LIDAR measurement channels.

16. The method of claim 15, further comprising:
with each of a second plurality of LIDAR measurement channels:
emitting a second measurement beam of illumination light;
detecting a second amount of return light reflected from a second respective surface in the environment in response to the second measurement beam of illumination light;
generating, with a second return signal receiver including a second amplifier, a second return signal indicative of each second amount of return light; and
providing, by the second return signal receiver, the second return signal to a second shared output node of the second plurality of LIDAR measurement channels;
generating a multiplexed output signal indicative of the return signals of the first plurality of LIDAR measurement channels and the return signals of the second plurality of LIDAR measurement channels; and
receiving the multiplexed output signal at an input channel of an analog to digital converter.

17. The method of claim 15, further comprising:
measuring a temperature of a location in close proximity to at least one of the illumination sources of the first plurality of LIDAR measurement channels, wherein:
the adjusting of the bias voltage supplied to the one or more illumination sources is based on a transmit subsystem temperature, and
the transmit subsystem temperature is the measured temperature.

18. The method of claim 15, further comprising:
receiving respective indications of return signals of the one or more LIDAR measurement channels, wherein the adjusting of the bias voltage supplied to the one or more illumination sources is also based on the respective indications of the return signals.

19. The method of claim 15, wherein the measurement beam of illumination light and the return signal share a common optical path, the method further comprising:
directing, by a beam directing element, the measurement beam of illumination light from the illumination source to a corresponding photodetector.

20. The method of claim 15, further comprising:
providing a direct current (DC) offset voltage to the amplifier of the return signal receiver of each of the first plurality of LIDAR measurement channels,
wherein the DC offset voltage is generated to increase signal to noise ratios of corresponding digital signals generated by an analog to digital converter.

* * * * *